(12) United States Patent
Nevalainen et al.

(10) Patent No.: US 10,040,273 B2
(45) Date of Patent: Aug. 7, 2018

(54) METHOD FOR MANUFACTURING A PACKAGING MATERIAL

(71) Applicant: Stora Enso OYJ, Helsinki (FI)

(72) Inventors: Kimmo Nevalainen, Kotka (FI); Jari Räsänen, Imatra (FI); Ville Ribu, Lappeenranta (FI)

(73) Assignee: STORA ENSO OYJ, Helsinki (FI)

( * ) Notice: Subject to any disclaimer, the term of this patent is extended or adjusted under 35 U.S.C. 154(b) by 95 days.

(21) Appl. No.: 15/119,482

(22) PCT Filed: Feb. 19, 2015

(86) PCT No.: PCT/IB2015/051268
§ 371 (c)(1),
(2) Date: Aug. 17, 2016

(87) PCT Pub. No.: WO2015/125101
PCT Pub. Date: Aug. 27, 2015

(65) Prior Publication Data
US 2017/0008264 A1 Jan. 12, 2017

(30) Foreign Application Priority Data

Feb. 19, 2014 (SE) ...................................... 1450204

(51) Int. Cl.
| | | |
|---|---|---|
| *B32B 27/32* | (2006.01) | |
| *B32B 27/10* | (2006.01) | |
| *B32B 37/15* | (2006.01) | |
| *B32B 7/12* | (2006.01) | |
| *B29C 47/06* | (2006.01) | |
| *B29C 47/02* | (2006.01) | |
| *B65D 1/26* | (2006.01) | |
| *B65D 65/40* | (2006.01) | |
| *B29C 47/00* | (2006.01) | |
| *C08L 23/06* | (2006.01) | |
| *B29K 23/00* | (2006.01) | |
| *B29L 9/00* | (2006.01) | |
| *B29L 31/00* | (2006.01) | |

(52) U.S. Cl.
CPC .......... *B32B 27/32* (2013.01); *B29C 47/0021* (2013.01); *B29C 47/0047* (2013.01); *B29C 47/0064* (2013.01); *B29C 47/025* (2013.01); *B29C 47/065* (2013.01); *B32B 7/12* (2013.01); *B32B 27/10* (2013.01); *B32B 37/15* (2013.01); *B65D 1/265* (2013.01); *B65D 65/40* (2013.01); *C08L 23/06* (2013.01); *B29K 2023/065* (2013.01); *B29K 2023/0625* (2013.01); *B29K 2023/0633* (2013.01); *B29K 2995/0017* (2013.01); *B29L 2009/005* (2013.01); *B29L 2031/7132* (2013.01); *B32B 2255/12* (2013.01); *B32B 2255/26* (2013.01); *B32B 2270/00* (2013.01); *B32B 2307/31* (2013.01); *B32B 2307/7244* (2013.01); *B32B 2307/7246* (2013.01); *B32B 2323/043* (2013.01); *B32B 2323/046* (2013.01); *B32B 2439/00* (2013.01); *B32B 2439/40* (2013.01)

(58) Field of Classification Search
CPC .......... B32B 27/32; B32B 7/12; B32B 27/10; B32B 37/15; B29C 47/025; B29C 47/065; B65D 65/40; B65D 1/265
See application file for complete search history.

(56) References Cited

U.S. PATENT DOCUMENTS

| | | | |
|---|---|---|---|
| 5,035,941 A | 7/1991 | Blackburn | |
| 5,196,269 A | 3/1993 | Kittrell et al. | |
| 5,674,342 A * | 10/1997 | Obijeski | ................. C08L 23/04 |
| | | | 156/244.11 |
| 7,335,409 B2 | 2/2008 | Penttinen et al. | |
| 2003/0145938 A1 | 8/2003 | Mortellite et al. | |
| 2005/0238901 A1 | 10/2005 | Dalgleish | |
| 2010/0047599 A1 | 2/2010 | Kvamme et al. | |

(Continued)

FOREIGN PATENT DOCUMENTS

| | | |
|---|---|---|
| EP | 3107076 A2 | 5/1984 |
| EP | 0336727 | 10/1989 |
| GB | 2323812 | 10/1998 |
| JP | H09142455 A | 6/1997 |
| WO | 0011075 A1 | 3/2000 |
| WO | 2001019592 | 3/2001 |
| WO | 2010098856 A1 | 9/2010 |
| WO | 2011004001 A1 | 1/2011 |
| WO | 2013074287 A1 | 5/2013 |

OTHER PUBLICATIONS

International Searching Authority, International Search Report, PCT/IB2015/051268, dated Jun. 2, 2015.

(Continued)

*Primary Examiner* — Robert Harlan
(74) *Attorney, Agent, or Firm* — Greer, Burns & Crain, Ltd.

(57) ABSTRACT

The invention relates to a polymer-coated packaging material, a method of manufacturing the same, and products, such as a disposable drinking cup, made from the material. The packaging material comprises a fibrous base (1) of paper or board and an extruded polymer layer (2) containing a blend of (i) 0 to 25 wt-% of a branched low-density polyethylene (LDPE) with a lower melt viscosity and (ii) 75 to 90 wt-% of a linear low-density polyethylene (LLDPE) with a higher melt viscosity. The packaging material of the invention comprises multilayer coatings, e.g. an adhesive innermost and a heat-sealable outermost layer (2, 4) of said blend and a vapor barrier middle layer (3) of at most 90 wt-% of high density polyethylene (HDPE). The layers (2, 3, 4) are brought and adhered to the fibrous base (1) by coextrusion. To maximize renewability of the materials HDPE and LLDPE as used for the structure are of biologic origin.

18 Claims, 1 Drawing Sheet

(56) References Cited

U.S. PATENT DOCUMENTS

| | | | |
|---|---|---|---|
| 2010/0316869 A1 | 12/2010 | Shelley et al. | |
| 2011/0248076 A1* | 10/2011 | Bentmar | B32B 27/32 |
| | | | 229/5.81 |
| 2011/0274892 A1* | 11/2011 | Chang | B29C 47/0021 |
| | | | 428/195.1 |
| 2012/0207954 A1* | 8/2012 | Dalpe | B65D 31/02 |
| | | | 428/35.4 |

OTHER PUBLICATIONS

Second Office Action for Chinese Patent Application No. 201380060875.4, dated Dec. 13, 2016.

* cited by examiner

METHOD FOR MANUFACTURING A PACKAGING MATERIAL

This application is a U.S. National Stage under 35 U.S.C. § 371 of International Application No. PCT/IB2015/051268, filed Feb. 19, 2015, which claims priority to Swedish application No. 1450204-1 filed Feb. 19, 2014.

FIELD OF INVENTION

The invention relates to a method for manufacturing a packaging material, in which polymer coating layers are extruded onto a fibrous base, such as paper, paperboard or cardboard. Further, the invention relates to a polymer-coated packaging material provided by the method, as well as a disposable drinking cup and other products made from the material.

BACKGROUND OF THE INVENTION

Fibre-based packaging materials for containers and product packages, such as packaging paper or board, are usually provided with a polymeric coating that makes the material liquid-tight and allows forming the container or package by heat sealing. Typical articles made from polymer coated paper or board are liquid packages and disposable tableware, such as drinking cups. LDPE (low-density polyethylene) is widely used for coating due to its good heat-sealability.

Recently there has been a growing demand on the market for such paper or board products made solely or at least predominantly of raw-materials from renewable sources, i.e. raw-materials of biologic origin. Traditionally polyethylenes have been produced from fossil raw materials such as petroleum. More recently polyethylenes made from sugar-cane, sugar beet or wheat grain have been developed, especially bio-LLDPE (linear low-density polyethylene) and bio-HDPE (high-density polyethylene) having easy availability. Also bio-LDPE, i.e. usual low-density polyethylene with a branched structure, is known but has limited supply and accordingly a high price. All these new polymer products have so far been tailored for the manufacture of polymer films, and their suitability to extrusion coating has been found to be poor.

EP 1 059 162 A2 describes packaging materials having layers of a blend of LDPE and LLDPE as a monolayer or as an innermost layer or an outermost layer of a multilayer coating on a paperboard base. The teachings principally aim at a liquid crystal polymer barrier, and there is no mention of the proportions of LDPE and LLDPE in the blend.

WO 00/776862 A1 discloses a monolayer of a blend of LDPE and LLDPE on a paperboard base, without teaching the proportions of the polymers in the blend. In this reference the principal teaching are focused to a polymer/nanoclay composite layer as an oxygen and moisture barrier.

SUMMARY OF THE INVENTION

There is thus a need for an improved process that allows technically effective and cost-efficient use of LLDPE, especially the film grade LLDPE of biologic origin readily available on the present-day market, for extrusion coating onto a fibrous base such as paper, paperboard or cardboard. The primary requirement is to achieve good adhesivity of the coating layer to the fibrous base. Furthermore, the coating layer should advantageously serve as a an innermost layer of multilayer coatings with good vapour barrier and heat sealing characteristics, as well as with coating layer weights as low as possible.

According to the invention, a superior polymer coating has surprisingly been achieved by coextrusion onto a fibrous paper, paperboard or cardboard base, into direct contact with the same, a multilayer coating comprising an innermost polymer layer containing a blend of (i) 10 to 25 wt-% of a branched low-density polyethylene (LDPE) having a lower melt viscosity and (ii) 75 to 90 wt-% of a linear low-density polyethylene (LLDPE) having a higher melt viscosity, a middle vapour barrier polymer layer, and an outermost heat-seal layer of the same blend as said innermost layer, the innermost layer adhering the coating to said fibrous base and the outermost layer forming a heat-seal layer, excluding materials comprising a coextruded layer, of more than 90 wt-% of high-density polyethylene (HDPE).

Thus, methods of manufacturing materials comprising a co-extruded layer, which layer is arranged further out compared to the innermost layer, e.g. on the outer side of the innermost layer or in-between the innermost and the outermost layers, are excluded from the claimed method The disclaimer above eliminates an overlap with a previously filed Swedish patent application 1300276-1 still secret at the priority date of the present application.

In comparison with a conventional coating of 100% LDPE the invention brings improved strength of sealing, and in comparison with a coating of 100% LLDPE the invention brings improved runnability in extrusion and improved adhesion to the fibrous base. The result is a workable solution having the advantage of a markedly increased share of bio-based material at an acceptable cost and easy availability of the materials.

As such blending of different kinds of polyethylenes is commonplace, and a multitude of such recipes may be found in the literature. However, those teachings mainly aim at making polymer films, not coatings onto a fibrous base, and thus tell nothing about adhesivity of such blends to a fibrous base as is an important aspect of the present invention. Furthermore, minor amounts of LLDPE are usually described as being blended with a major share of usual branched LDPE, not the reverse as taught by the present inventors.

As preferable embodiments of the invention the polymer blend may contain 80 to 90 wt-%, preferably 80 to 85 wt-%, and most preferably 80 wt-% of LLDPE and 10 to 20 wt-%, preferably 15 to 20 wt-%, and most preferably 20 wt-% of LDPE.

Preferably the LDPE used for the invention has a melt index of at least 25 g/10 min (190° C., 2.16 kg) and the LLDPE used for the invention has a melt index of at most 10 g/10 min (190° C., 2.16 kg).

The invention thus makes possible an increased use of bio-HDPE so as to achieve by simple means an improved water vapour barrier in the paper or board product.

HDPE in general has an advantage over LDPE or LLDPE in providing a superior water vapour barrier, which is very desirable in liquid containers and packages. On the other hand HDPE has a poor heat-sealability due to its higher melting temperature as compared to LDPE, and even its adhesivity in direct contact to a fibrous base is deficient. Furthermore, pure HDPE is not suitable for monolayer extrusion coating due to its narrow molecular weight distribution (MWD). Pure HDPE has a high neck-in and poor runnability in extrusion coating, when producing thin coatings of a coating weight of 15 to 25 g/m$^2$.

In the prior art, see e.g. U.S. Pat. No. 7,335,409, a combination of an inner HDPE layer and an outer LDPE layer has been described as providing a water vapour barrier and heat-sealability. However, adhesivity of such combination to a fibrous base is insufficient, and the present poor availability of bio-grade LDPE is another handicap from the environmental point of view.

By means of the innermost coating layer of the blend of LDPE and LLDPE the invention overcomes the neck-in and runnability problems of HDPE in extrusion and, as a double-layer structure, allows improved adhesion to the fibrous base. A layer of the polymer blend as described above is co-extruded as an inner layer between an outer layer of at most 90 wt-% of HDPE and the fibrous base.

The outer vapour barrier layer of at most 90 wt-% of HDPE thus has a share of at least 10 wt-% of other polymers such as LDPE or LLDPE, which would improve heat-sealability of said barrier layer.

The invention thus provides a layer of the blend of LDPE and LLDPE, which serves as an adhesive layer in direct contact with the fibrous base. At the same time a similar polymer blend layer may also be arranged as an outermost heat-sealing layer as the packaging material is formed into containers or closed product packages. A vapour barrier layer of at most 90 wt-% of HDPE would be sandwiched between the two polymer blend layers. The major share of the biopolymers turns the product predominantly renewable-based even if the minor share of LDPE were of petroleum-origin.

According to an advantageous embodiment of the invention an innermost adhesive layer of the blend of LDPE and bio-LLDPE, a middle layer of a blend of 50 to 90 wt-% of HDPE and 10 to 50 wt-% of LDPE or LLDPE, and an outermost heat-sealable layer of such blend are coextruded at a single step onto the fibrous base. Preferably the same blend is used for both the innermost and the outermost polymer layer. The structure may consist of the innermost, the middle and the outermost polymer layers on the fibrous base, or there may be further polymer layers, such as an oxygen barrier layer e.g. of EVOH or polyamide sandwiched between said innermost and outermost polymer blend layers.

HDPE, whenever used in the structures according to the invention, is preferably of biologic origin, i.e. also in a middle all-HDPE layer.

Further embodiments of the invention provide that the weight of an innermost adhesive layer of said blend is at most 15 g/m$^2$, preferably at most 10 g/m$^2$, and most preferably about 5 g/m$^2$, that the weight of an outermost heat-seal layer of said blend is at most 15 g/m$^2$, preferably at most 10 g/m$^2$, and most preferably about 5 g/m$^2$, and that the weight of a middle HDPE+LDPE or HDPE+LLDPE blend layer is at most 15 g/m$^2$, preferably at most 10 g/m$^2$, and most preferably about 5 g/m$^2$. Preferably in a triple-layer coating the total weight of the polymer layers is at most 25 g/m$^2$, preferably at most 20 g/m$^2$, and most preferably about 15 g/m$^2$. Very thin multiple polymer layer structures are thus made possible by the invention.

Reducing the coating layer weights even further would be desirable from economic and environmental points of view. Within the scope of the invention, triple layers with respective coating layer weights of 4+4+4 g/m$^2$ or even 4+2+4 g/m$^2$ could be contemplated, if made possible by existing coextrusion techniques.

The invention further covers heat-sealable packaging materials, which are obtainable by the method according to the invention as claimed.

Preferably a heat-sealable packaging material according to the invention comprises:

(a) a fibrous base of paper, paperboard or cardboard,
(b) an innermost adhesive layer of a blend of (i) 10 to 25 wt-% of a low-density polyethylene (LDPE) having a lower melt viscosity and (ii) 75 to 90 wt-% of a linear low-density polyethylene (LLDPE) having a higher melt viscosity, the innermost layer being in a direct contact with said fibrous base,
(c) a middle layer of a vapour barrier polymer or blend of polymers, and
(d) an outermost heat-sealable layer of a blend of (i) 10 to 25 wt-% of a low-density polyethylene (LDPE) having a lower melt viscosity and (ii) 75 to 90 wt-% of a linear low-density polyethylene (LLDPE) having a higher melt viscosity, said innermost, middle and outermost layers having been brought by coextrusion onto said fibrous base.

Preferably the packaging material according to the invention is coated with one or more polymer layers on both sides.

The final products included in the scope of the invention include a drinking cup made by heat-sealing from the packaging material as described above. Other articles covered by the invention are disposable plates, trays and other tableware, as well as sealed liquid packages such as dairy product and juice cartons, where further oxygen and light barrier layers may be desirable.

In connection with the invention, high-density polyethylene refers to polyethylenes with a density of more than 0.940 g/cm$^3$.

The invention is especially suitable for the production of materials for packaging of food, especially frozen food, but is not limited to this application.

DETAILED DESCRIPTION

Figure 1:
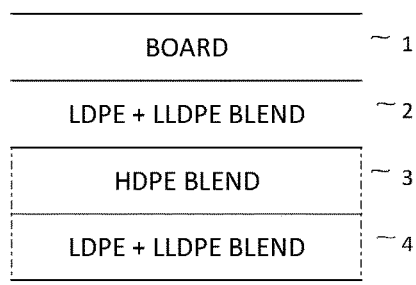
FIG. 1 shows the multilayer structure of a first packaging material according to the invention.

The packaging material shown in FIG. 1 comprises a fibrous base 1, an inner adhesive layer 2 in direct contact with the fibrous base 1, the adhesive layer 2 comprising a blend of (i) 10 to 25 wt-% of a branched low-density polyethylene (LDPE) of a lower melt viscosity and (ii) 75 to 90 wt-% of a linear low-density polyethylene (LLDPE) of a higher melt viscosity, a middle layer 3 of a blend of 50 to 90 wt-% of HDPE and 10 to 50 wt-% of LDPE or LDPE and outermost layer 4 of a polymer blend, which is similar to, preferably the same as the blend used for the innermost adhesive layer 2. In the blend forming the inner adhesive layer 2, and the outermost layer 4, the low-density polyethylene (LDPE) preferably has a melt index of at least 15 g/10 min (190° C., 2.16 kg) and the linear low-density polyethylene (LLDPE) preferably has a melt index of at most 10 g/10 min (190° C., 2.16 kg). HDPE and LLDPE as used in the structure are of renewable biologic origin. The fibrous base 1 may be paper, paperboard or cardboard of a weight of 40 to 500 g/m$^2$, preferably board of a weight of 170 to 350 g/m$^2$. The outermost layer 4 is useful as a heat-sealing layer as the material is turned into containers such as disposable drinking cups for instance. The three layers 2, 3, 4 have been brought onto the fibrous base 1 by coextrusion. The weight of each one of the coextruded polymer layers 2, 3, 4 may be e.g. 3 to 12 g/m², preferably 5 to 10 g/m².

Figure 2:
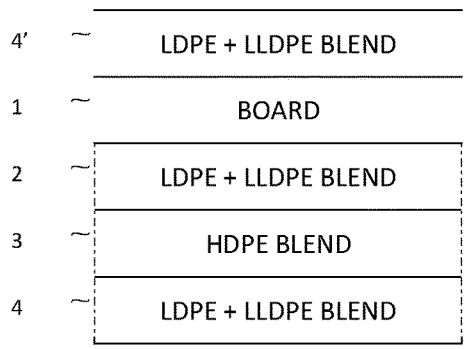
FIG. 2 shows the multilayer structure of a second packaging material according to the invention.

The packaging material according to FIG. 2 differs from the material shown in FIG. 1 in that it even comprises a heat-sealing layer 4' on the opposite side of the fibrous base 1. Preferably this heat-sealing layer 4' is of a polymer blend, which is the same as the blend used for the innermost and outermost layers 2, 4 on the reverse side of the fibrous base, the latter forming the inside as the material is turned into a drinking cup.

Figure 3:
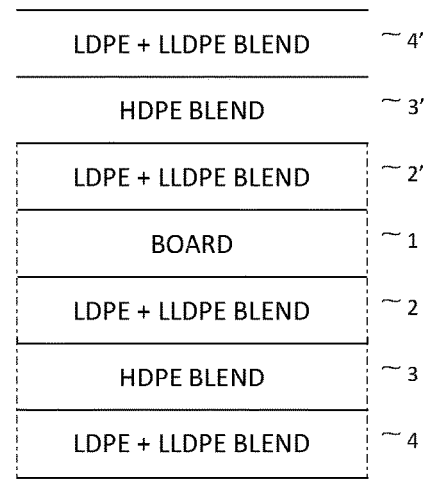
FIG. 3 shows the multilayer structure of a third packaging material according to the invention.

The packaging material according to FIG. 3 comprises a coextruded multilayer structure 2, 3, 4; 2', 3', 4' on both sides of the fibrous base 1. These multilayer structures may both correspond to that described above in connection with FIG. 1. The material of FIG. 3 is suitable for heat-sealed product packages shielded against water vapour penetration from both the inside of the package, i.e from a moist product, and from the outside of the package, i.e. from humid ambience.

EXAMPLES 20 wt-% of extrusion grade LDPE of petroleum oil origin was dry blended with 80 wt-% of film grade bio-LLDPE of sugar cane origin to form a polymer blend. A layer of this polymer blend having a coating weight of 15 g/m² was extruded onto a paperboard surface into direct contact with the same. The coating layer was achieved with good runnability, acceptable neck-in and good adhesion to the paperboard.

A series of tests was carried out in order to determine the performance of the above blend as an adhesion layer between paperboard and one or more outer polymer layers in a coextruded multilayer coating. Layers of 100 wt-% bio-HDPE were used for testing, but in regard of adhesion these do not differ significantly from blends of 50 to 90 wt-% of HDPE and 10 to 50 wt-% of LDPE or LLDPE within the scope of the invention. Extruded monolayer coatings, as well as coextruded multilayer coatings with an innermost HDPE+LDPE blend layer, were included as a comparison.

Extrusion grade oil-based LDPE, film grade bio-HDPE, and film grade bio-LLDPE (bio-HDPE and bio-LLDPE made from sugar cane by Braskem, Brazil) were used for the tests. The neck-in in extrusion and heat-sealing temperature of the finished material were measured, and adhesion to the board base was evaluated on a scale 1 (no adhesion) to 5 (perfect adhesion). The results are presented in the following table 1.

even though the total coating weights and thicknesses were reduced, and by addition of an outermost layer of the same blends considerably improved heat-sealability in case of LLDPE+LDPE.

The invention claimed is:

1. A method of manufacturing a heat-sealable packaging material, comprising coextrusion onto a fibrous paper, paperboard or cardboard base, into direct contact with the same, a multilayer coating comprising an innermost polymer layer containing a blend of (i) 10 to 25 wt-% of a low-density polyethylene (LDPE) having a melt viscosity and (ii) 75 to 90 wt-% of a linear low-density polyethylene (LLDPE) having a higher melt viscosity than the LDPE, a middle vapour barrier polymer layer, and an outermost heat-seal layer of the same blend as said innermost layer, the innermost layer adhering the coating to said fibrous base and the outermost layer forming a heat-seal layer, wherein the outermost heat-seal layer excludes materials comprising more than 90 wt-% of high-density polyethylene (HDPE).

2. The method of claim 1, wherein said polymer blend contains 80 to 90 wt-% of said LLDPE and 10 to 20 wt-% of said LDPE.

3. The method of claim 1, wherein said LDPE has a melt index of at least 25 g/10 min (190° C., 2.16 kg) and that said LLDPE has a melt index of at most 10 g/10 min (190° C., 2.16 kg).

4. The method of claim 1, wherein the weight of each one of the innermost adhesive layer, the middle vapour barrier layer, and the outermost heat-sealable layer is at most 15 g/m².

5. The method of claim 1, wherein a blend containing up to 90 wt-% of HDPE of biologic origin is used for said middle vapour barrier layer.

6. The method of claim 1, wherein LLDPE of biologic origin is used for said blend.

7. A heat-sealable packaging material comprising
    (a) a fibrous base of paper, paperboard or cardboard,
    (b) an innermost adhesive layer of a blend of (i) 10 to 25 wt-% of a low-density polyethylene (LDPE) having a lower melt viscosity and (ii) 75 to 90 wt-% of a linear low-density polyethylene (LLDPE) having a higher melt viscosity, the innermost layer being in a direct contact with said fibrous base,
    (c) a middle vapour barrier polymer layer, and

TABLE 1

| Structure | g/m² | Thicknesses (μm) | Heat sealing (° C.) | Adhesion (0-5) | Neck-in (mm) |
|---|---|---|---|---|---|
| Board/LDPE* | 15 | 15 | 360 | 5 | 60 |
| Board/LLDPE + 20% LDPE | 15 | 15 | 440 | 5 | 90 |
| Board/LLDPE + 20% LDPE/HDPE/LLDPE + 20% LDPE | 15 | 5/5/5 | 440 | 5 | 90 |
| Board/LLDPE + 20% LDPE/HDPE/LLDPE + 20% LDPE | 20 | 5/10/5 | 430 | 5 | 90 |
| Board/HDPE + 20% LDPE/HDPE/HDPE + 20% LDPE* | 15 | 5/5/5 | 510 | 5 | 85 |
| Board/HDPE + 20% LDPE/HDPE/HDPE + 20% LDPE* | 20 | 5/10/5 | 510 | 5 | 85 |
| Board/HDPE + 20% LDPE/HDPE* | 15 | 10/5 | 490 | 5 | 85 |
| Board/HDPE* | 25 | 25 | 500 | 3.5 | 110 |

*comparative

The comparative HDPE monolayer coating had the worst neck-in and adhesion in spite of the largest layer thickness. Thinner HDPE monolayers failed in extrusion altogether. Adding an inner layer of a blend of LLDPE with 20 wt-% of LDPE improved adhesion and diminished the neck-in, (d) an outermost heat-sealable layer of a blend of (i) 10 to 25 wt-% of a low-density polyethylene (LDPE) having a melt viscosity and (ii) 75 to 90 wt-% of a linear low-density polyethylene (LLDPE) having a higher melt viscosity than the LDPE, said innermost, middle and outermost layers having been brought by coextrusion onto said fibrous base.

8. The packaging material of claim 7, wherein the weight of each one of the innermost, middle and outermost polymer layers is at most 15 g/m$^2$, and the total weight of the polymer layers is at most 25 g/m$^2$.

9. The packaging material of claim 7, wherein a blend containing up to 90 wt-% of HDPE of biologic origin has been used for said middle vapour barrier polymer layer.

10. The packaging material of claim 7, wherein LLDPE of biologic origin has been used for said blend with LDPE.

11. A drinking cup made by heat-sealing from the packaging material made by the method of claim 1.

12. A drinking cup made by heat-sealing from the packaging material of claim 7.

13. The method of claim 1, wherein said polymer blend contains 80 to 85 wt-%, and 15 to 20 wt-% of said LDPE.

14. The method of claim 1, wherein said polymer contains about 80 wt-% of said LLDPE and about 20 wt-% of said LDPE.

15. The method of claim 1, wherein the weight of each one of the innermost adhesive layer, the middle vapour barrier layer, and the outermost heat-sealable layer is at most 10 g/m$^2$.

16. The method of claim 1, wherein the weight of each one of the innermost adhesive layer, the middle vapour barrier layer, and the outermost heat-sealable layer is at most 5 g/m$^2$.

17. The packaging material of claim 7, wherein the weight of each one of the innermost, middle and outermost polymer layers is at most 10 g/m$^2$, and the total weight of the polymer layers is at most 20 g/m$^2$.

18. The packaging material of claim 7, wherein the weight of each one of the innermost, middle and outermost polymer layers is at most 5 g/m$^2$, and the total weight of the polymer layers is at most 15 g/m$^2$.

* * * * *